United States Patent [19]

Salacuse

[11] Patent Number: 4,624,432
[45] Date of Patent: Nov. 25, 1986

[54] HEAVY DUTY CLAMPING SYSTEM
[75] Inventor: Frank Salacuse, New York, N.Y.
[73] Assignee: Super Glue Corporation, Hollis, N.Y.
[21] Appl. No.: 678,614
[22] Filed: Dec. 6, 1984

Related U.S. Application Data

[63] Continuation of Ser. No. 508,964, Jun. 29, 1983, abandoned.
[51] Int. Cl.$^4$ .............................................. F16L 3/08
[52] U.S. Cl. .............................. 248/316.5; 248/74.5
[58] Field of Search ............... 248/316.7, 316.9, 316.6, 248/74.3, 74.1, 74.5, 113, 68.1; 24/487, 543; 52/689

[56] References Cited

U.S. PATENT DOCUMENTS

| | | | |
|---|---|---|---|
| 3,471,987 | 10/1969 | Yelsma | 52/689 X |
| 3,954,238 | 5/1976 | Nivet | 248/68.1 |
| 4,061,299 | 12/1977 | Kurosaki | 248/74.5 |
| 4,240,604 | 12/1980 | Brach | 248/316.9 |
| 4,295,618 | 10/1981 | Morota et al. | 248/74.5 |
| 4,386,752 | 6/1983 | Pavlak et al. | 248/543 |

Primary Examiner—Ramon S. Britts
Assistant Examiner—Ramon O. Ramirez
Attorney, Agent, or Firm—Paul J. Sutton

[57] ABSTRACT

The present invention provides a multi-purpose, snap-clamp system capable of releasably holding objects of medium weight. The system is one piece and injection molded of polypropylene or similar plastic. The system, which includes a resilient spring member having two end portions, two interconnected by a film-hinge control levers each connected to one of the end portions by a film-hinge, and at least one gripping member connected at one of the end portions to one of the control levers and capable of being detachably connected to the other end portion, includes two resilient mounting legs connected at one of their ends to the end portion of the spring member and at the other of their ends to a mounting base, which in turn is mounted to a surface such as a wall. The gripping member along with the two control levers are movable between open and closed positions wherein the closed position the gripping member and the two control levers form a gripping cavity adapted to hold an object. The leg members are adapted to absorb bending stresses to allow the system to hold objects of medium size and weight such as a hammer, or greater size and weight.

10 Claims, 4 Drawing Figures

HEAVY DUTY CLAMPING SYSTEM

This is a continuation of application Ser. No. 508,964, filed June 29, 1983, now abandoned.

This invention relates generally to holding devices and more particularly to a multi-purpose clamp for household and industrial use for releasably holding objects.

U.S. Pat. No. 4,240,604 describes a clamping device having a snap-clamp part which is capable of releasably holding varied objects used in a household or a workshop. The device has a clamp which snaps open to a biased open position and snaps shut to a baised closed position. As described in U.S. Pat. No. 4,240,604, the device is permanently mounted with the clamps of the device generally in a horizontal alignment with the gripping space formed by the clamps oriented vertically. Thus, a toothbrush or other such object can be hung from the device through the gripping space when the clamp is closed. One of the clamp arms is provided with a handle extension.

U.S. Pat. No. 4,240,604 further describes a fastening extension 4 for a bending spring 10, which is arcuate as shown in FIG. 1. Fastening extension 4 is connected to a base which is not shown; the base in turn would be flat and provided with either a fastening binder or with screw holes for screw mounting to a wall or similar surface. It is of particular interest that fastening extension 4 which connects the center bottom of the bending spring directly with the base, is a single piece mount, so that the bending spring suffers certain stress factors during opening, closing, and during use that are concentrated at two points.

No dimensions were described for the holding device in U.S. Pat. No. 4,240,604, but the uses were clearly described, including holding a toothbrush. In fact, the diameter of the gripping cavity formed by the holding device in the closed mode would be somewhere in the range of 10 millimeters.

It is apparent that the holding device being described has a much wider applicability than the uses described therein by way of example, such as for holding a toothbrush. In fact, the holding device being discussed can be used for many other purposes, such as holding much larger items than those described; for example, the holding device could hold a large hammer, or electrical conduit, either along a wall or on the floor, or other relatively large items. If, to accommodate such objects the holding device were doubled or tripled in size from the size adapted to hold an object such as a toothbrush, it becomes apparent that the fastening extension for the holding device in U.S. Pat. No. 4,240,604, becomes questionable as to whether it is adequate to service as a mount for absorbing much heavier stresses than those caused by toothbrushes. For example, the holding device being discussed is injection molded as one piece preferably of polypropylene. Although the material is biasable and relatively fatigue free, especially under low-pressured movements or usage, but under repeated movement or continuous usage, a larger holding device could be susceptible to fatigue or deformation in the concentrated areas of the single fastening extension 4 described in U.S. Pat. No. 4,240,604. This undesirable result can happen primarily because the ends of bending spring 10, specifically at the portions at film-hinges 12 and 13, are unsupported.

It is therefore an object of the present invention to provide a multi-purpose holding device as described in U.S. Pat. No. 4,240,604 that has a mounting extension that connects the device to a base where the extension supports the device so as to reduce movement and distribute stress when the device is constructed for accommodating relatively heavy loads.

It is another object of the present invention to provide a mounting extension for the above-described holding device that supports the ends of the bending spring.

It is a further object of the present invention to provide a mounting extension for the above-described holding device that connects the ends of the mounting spring to a base member.

It is yet another object of the present invention to provide the mounting extension of the holding device described above that includes a pair of mounting legs that connects the free ends of the bending member to the base.

It is another object of the present invention to provide a pair of mounting members that attach the ends of the bending spring described above to the base in a manner that distributes stress during movement or usage of the device when the device is contracted to provide for relatively heavy loads.

It is further object of the present invention to provide a stop connector at the free ends of the two lever members that detachably locks the ends together when relatively heavy loads are applied to the device.

In accordance with the above and other objects, a multi-purpose holding system is provided that include a body produced in one piece from plastic. The body includes a resilient spring member having two end portions having two film hinges. Each of the film hinges is connected to one of the end portions. The spring member has opposed open and closed sides. The body further includes two interconnected control levers, each of the control levers being connected to one of the two film hinges and disposed on the open side of the spring member. The body also includes a middle film-hinge that interconnects the two control levers. The body further includes at least one gripping member connected at one of the end portions to one of the two control levers. The gripping member along with the two control levers movable between an open and a closed position, wherein the closed position the gripping member is detachable connected at the other of the end portions to the other of the control levers, forming with the one control lever and the other control lever a gripping cavity for holding an object; and in the open position the least one gripping member being spaced from the other of the end portions. The body further includes two resilient mounting members having connecting ends and base ends, the connecting ends being secured to the end portions of the spring member. The body includes a substantially flat base connected to the base ends of the mounting members, the base being disposed on the closed side of the spring members.

The present invention will be more clearly understood from the following description of specific embodiments of the invention together with the accompanying drawings where similar reference characters denote similar elements throughout the several views and in which.

Reference is now made in detail to the drawings.

Before proceeding to a description of the present invention, a brief description will first be made of the snap-clamp device described in detail in U.S. Pat. No. 4,240,604, which is mounted in the manner described in that patent and as described herein.

Figure 1:
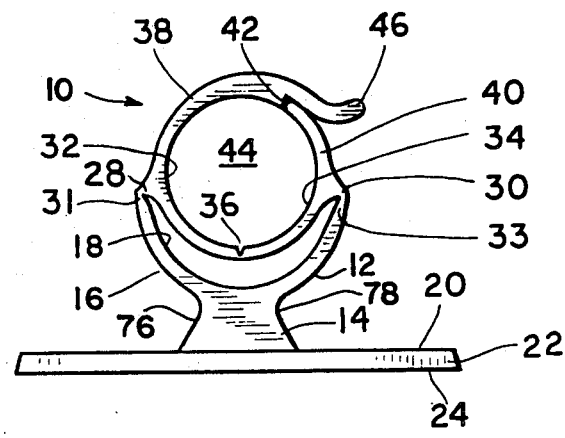
FIG. 1 is a front view of a holding device having a fastening extension secured to a base according to the prior art.

The prior art snap-clamp device 10 is shown in its prior art aspect in FIG. 1. Snap-clamp device 10 is preferably injection molded in one piece from polypropylene or similar plastic. Snap-clamp device 10 includes a resilient bending spring 12, which is shown as partly circular in front view and preferably less than semi-circular as shown. Bending spring 12 is secured to a single mounting portion 14 at the center of its convex, or closed, side 16, which is opposite its concave, or open, side 18. Mounting portion 14 in turn is connected to outer surface 20 of flat base member 22. Opposed inner surface 24 of base member 20 is provided with an attaching surface binder that is adapted to be attached to a flat surface such as a wall. Alternatively, base member 22 can be provided with screw holes (not shown) and attached to a wall or similar surface by screws. It is particularly noted that other constructions and arrangements of bending spring 12 is secured to a single mounting portion 14 at the center of its convex, or closed, side 16, which is opposite its concave, or open, side 18. Mounting portion 14 in turn is connected to outer surface 20 of float base member 22. Opposed inner surface 24 of base member 20 is provided with an attaching surface binder that is adapted to be attached to a flat surface such as a wall. Alternatively, base member 22 can be provided with screw holes (not shown) and attached to a wall or similar surface by screws. It is particularly noted that other constructions and arrangements of bending spring 12 are shown, described, and claimed in U.S. Pat. No. 4,240,604.

Bending spring 12 terminates at each of its end portions 31 and 33 in two film-hinges 28 and 30, respectively, but which bending spring 12 is connected with two control levers 32 and 34, respectively. Control levers 32 and 34 are interconnected by a middle film-hinge 36. At least one of the control levers has one gripping member that forms a gripper with the other control lever. In the preferred embodiment, there are two control lever gripping members 38 and 40 tending from respective control levers 32 and 34, respectively. Gripping members 38 and 40 are movable about film-hinges 28 and 30 and control levers 32 and 34 are movable about middle film-hinge 36 between open closed positions. In the closed position shown in FIG. 1, the free end of gripping member 40 adjoins the free end of gripping member 38 at stop 42.

When gripping members 38 and 40 are detachably connected at stop 42 as shown in FIG. 1, the gripping members form with bending spring 12 a gripping cavity 44, which is adapted to receive and hold an object (not shown). In the open position gripping members 38 and 40 are spaced from one another, a mode that will be discussed with reference to FIG. 4. As noted above, it is possible to have only one gripping member that is adapted to be attached to a stop connector at either end portion 31 or 33, where a stop connector similar to stop connector 42 would be located.

In addition, FIG. 1 shows a gripping extension or handle, 46 connected to the free end of gripping member 38.

At this point rather than proceed with the open and closed positions of snap-clamp 10, a description of the present invention will proceed below, since the actual opening and closing movements of the prior art device and the present invention are the same, except for different stress, shearing, and strain forces that result in the area of mounting portion 14 during opening and closing movements of the device and, in addition, while the snap-clamp device is in use with the object positioned in gripping cavity 44.

Figure 2:
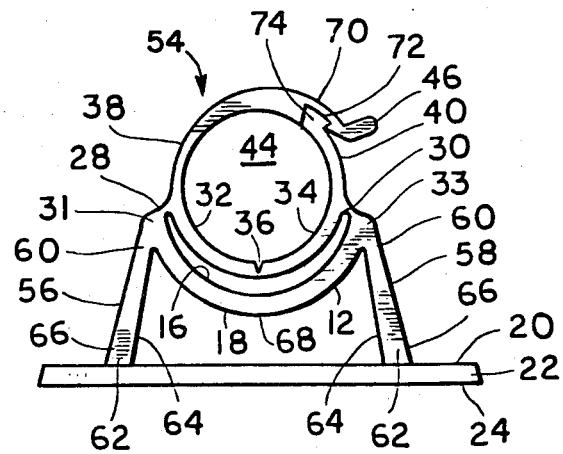
FIG. 2 is a front view of the holding device having a fastening extension secured to a base according to the present invention.
Figure 4:
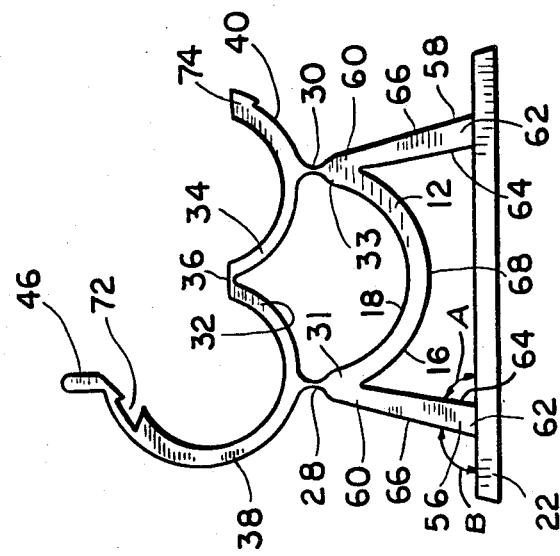
FIG. 4 shows a view of the device in the open mode with the gripping extension disposed downwardly in a hooking position.
Figure 3:
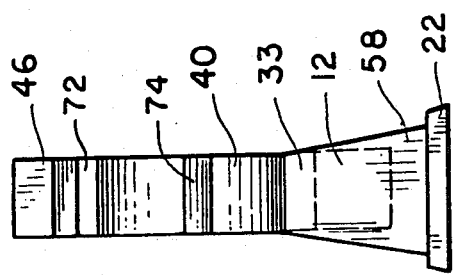
FIG. 3 is a side view of the holding device according to the present invention as shown in FIG. 2.

Snap-clamp device 54 in accordance with the present invention and as shown in FIGS. 2, 3, and 4, has many of the same elements as prior art device 10 shown in FIG. 1. A description of the elements in FIGS. 2, 3 and 4 will be made with reference to the elements in FIG. 1 common to both devices. Snap-clamp device 54 and snap-claim device 10 have in common in construction and arrangement bending spring 12, closed side 16, open side 18, outer surface 20, base member 22, inner surface 24, film-hinges 28 and 30, end portions 31 and 33, control lever gripping members 38 and 40, and gripping cavity 44.

In certain other areas, however, significant differences exist between snap-clamp device 10 and snap-clamp device 54. As noted previously in the general discussion of prior art, snap-clamp device 10 is directed at attaching a multiciplicity of objects adapted to being held in gripping cavity 44. Gripping cavity 44 in FIG. 1 is approximately 10 millimeters in diameter, that is, adapted to grip objects in the size range of toothbrushes, silver settings, screw drivers, keys, and so forth. Snap-clamp device 54, however, is directed at holding objects considerably larger than the objects contemplated for prior art snap-clamp device 10. Such objects could include, for example, hammers, large wrenches, appliances, and in general for other objects as yet not specifically projected, but, example, could include conduit or pipe. Gripping cavity 44 in snap-clamp device 54 is in the range of 25 millimeters in diameter and larger diameters are contemplated for other uses.

FIGS. 2, 3 and 4, therefore, in accordance with the present invention, show snap-clamp device 54 having two resilient leg members 56 and 58 each having a connecting end 60 and a base end 62. Connecting ends 60 are connected to end portions 31 and 33 of spring member 12 adjacent to film-hinges 30 and 32. Base ends 62 are connected to base member 22. As shown in the side view of FIG. 3, snap-clamp device 54 has general uniform width as to bending spring 12, control levers 32 and 34, and gripping members 38 and 40. Again, the width of the named elements in snap-clamp device 54 is considerably greater than those in snap-clamp device 10 of the prior art. For the latter, a width of approximately 8 millimeters is contemplated, while for the snap-clamp device 54 a width of approximately 12 millimeters, and more, is anticipated. Resilient leg members 58 and 60 are of the same width as bending spring 12 where they are joined to end portions 31 and 33 and are preferably wide as they approach base member 22. With reference once again to FIG. 2, leg members 56 and 58, which are flat when viewed from the front view, are directly opposed to one another and each extends from base member 22 towards bending spring 12 at a slight angle from base member 21, that is, leg members 56 and 58 are more distant from one another at base ends 62 at base member 22 than they are from one another at connecting ends 60 at bending spring 12. As shown in FIG. 2, leg members 56 and 58 are slightly thicker at their base ends 62 than at their connecting ends 60. For this reason, the angle that leg members 56 and 58 make with base member 22 varies slightly depending on whether inner surfaces 64 or outer surfaces 66 of the leg members are used as the measuring base. In the preferred embodiment, the opposed internal angles A that leg members 56 and 58 make as they extend from base member 22 to bending spring 12 are preferably approximately 79 degrees as measured from opposed inner surfaces 64 of leg members 56 and 58. When measured from outer surfaces 66 to base members 22, the angle B is approximately 105 degrees. These measurements are approximate and can vary according to specific requirements.

As seen in FIG. 2, leg members 56 and 58 extend from base member 22 a sufficient distance to clear the center of the arcuate curve of bending spring 12 from contact with base 22, and preferably is additionally spaced from base member 22 to allow room for any object mounted in gripping cavity 44 to clear base member 22, since the object would have an extension to hang from control levers 32 and 34 and gripping members 38 and 40 such as the bristles of a toothbrush.

Before proceding to a discussion of some of the resulting advantages that leg members 56 and 58 have compared to single mounting portion 14, a description of the open position as shown in FIG. 4 will now be made. This description applies in the same manner to the prior art embodiment of FIG. 1, which is in the closed position.

FIG. 4 is illustrated with gripping member 38 and 40 in the open position to which they were moved from the closed position of FIG. 2. This is accomplished by applying a force, generally via the finger of a user, to gripping handle 46 and thus pulling gripping member 38 apart from gripping member 40. The pulling action results in gripping member 38 being rotated about end portion 31 of bending spring 12 and simultaneously in rotating control lever 32 about end portion 31 so that middle film-hinge 36 is forced away from bending spring 12 and both control lever 34 and gripping member 40 are rotated about end portion 33. The rotational opening movements of the control levers and gripping members are forced until middle film-hinge 36 is maximally compressed by control levers 38 and 40, after the compressive force is released and the control levers snaped apart until the maximal strain on middle film-hinge 36 is reached and movement ceases. It is noted that the linear distance between end portions 31 and 33 is slightly less than the sum of the distances between each end portion and middle film-hinge 36, so that the two control levers are pressed tightly together at the point of maximal compression. This point is possible to attain because of the flexibility and biased quality of bending spring 12, which flexes into a biased mode as the two control levers approach one another at middle film-hinge 36, that is, end portions 31 and 33 are flexed slightly towards base member 22. Bending spring 12 is released from its biased mode after control levers 34 and 36 have passed their point of maximal compression in either direction at middle film-hinge 36 and the control levers are than biased either to their closed or open mode, depending on their direction of travel. The return from open mode to closed mode is exactly the reverse of the described movement from closed to open mode, except that movement of gripping member 40 is stopped by stop connector 70. Stop connector 70 includes a female recess 72 formed at the inner surface of gripping member 38 at its free end, the recess being adapted to receive male insert 74 positioned at the free end of gripping member 40. It is particularly noted that stop connector 70 differs from stop 42 shown in the prior art embodiment of FIG. 1. Stop connector 70 is particularly useful in the heavier use projection for snap-clamp device 54, since gripping member 40 cannot back out of connection with gripping member 38 under imposition of greater forces to snap-clamp 54 than would be present for snap-clamp 10.

Certain observations will be made here concerning the specific advantages of leg members 56 and 58 over single mounting portion 14. First of all, it has been described that bending member 12 must give or spread apart to some extent when snap-clamp device 10 or 54 are moved between their closed and open modes, since control levers 32 and 34 are longer than the distance between end portions 31 and 33. This creates an outwardly directed pressure on end portions 31 and 33 of bending spring 12. It is particularly noted that in FIG. 1 this pressure results in deformation of bending spring 12 at its points of contact 76 and 78 with single mounting portion 14. It is further noted that bending spring 12 is not entirely free of such factors as fatigue and permanent deformation upon repeated openings and closings of snap-lock device 10. Such fatigue or deformation could result in imperfect closing of gripping members 38 and 40 in the closed mode. This is not considered a real problem for the small loads contemplated for the prior art device of FIG. 1. It is, however, a concern for the heavier loads contemplated for snap-clamp device 54. When bending member 12 is stretched during opening and closing movements, deformations take place not at two positions but at four positions, namely, at top contract areas 60 between leg members 56 and 58 and bending spring 12 and at bottom contact areas 62 between leg members 56 and 58 and base member 22. This spreading out of the areas of stress reduces considerably the possibility of fatigue or deformation of the bending spring.

Another advantage of leg members 54 and 56 is that during use, that is, when downward force is continuously applied to the control levers and the gripping members, there is a locking effect created by the presence of the leg members against movement of deformation of bending member 12 relative to base member 22. On the other hand, however, if a considerable force were applied over a period of time to snap-clamp device 54 that in fact used the single mounting portion 14 of the prior art device as shown in FIG. 1, end portions 31 and 33 would be more or less free to bend and to rotate. With the light loads intended for the prior art device, this is not a concern, but for the heavier loads foreseen for snap-clamp device 54, there is no doubt that during actual use the leg members shown in FIGS. 2, 3 and 4 are much to be preferred to single mounting portion 14, since end portions 31 and 33 are much more firmly anchored.

Finally, it is noted that both snap-clamp devices 10 and 54 can be used in the open mode shown in FIG. 4, with the device oriented so that gripping extension 46 is hung downward as base member 22 is fastened to a wall. In the position described, gripping extension 46 can be used as a hook. With this usage in mind, it is easy to see that under heavy loads the uppermost end portion, in this case end portion 31, would tend to droop downwards away from base member 22. With the presence of leg members 56 and 58, however, there would be no drooping, since leg member 56 would be anchored to the wall via base 22.

In summary, it may be said that there are several advantages to the presence of leg members 56 and 58 when heavier loads are foreseen and a larger snap-clamp device 54 is used to accommodate the heavier loads.

The embodiment of the invention particularly disclosed and described hereinabove is presented merely as an example of the invention. Other embodiments, forms, and modifications of the invention coming within the proper scope and spirit of the appended claims will, of course, readily suggest themselves to those skilled in the art.

What is claimed is:

1. An improved multi-purpose holding system of the type of holding system having interconnected control levers capable of being moved by snapping between open and closed modes when relatively heavy loads are contemplated for the system, in combination, comprising:
   a body produced from one piece of plastic, said body including,
   a resilient spring member having two end portions and two film hinges, each of said two film hinges being connected to one of said end portions, said spring member having opposed open and closed sides,
   two interconnected control levers, each of said control levers being connected to one of said two film hinges and disposed on said open side of said spring member, said two control levers including a middle film hinge interconnecting said two control levers,
   at least one gripping member connected at one of said end portions to one of said two control levers, said one gripping member and said two control levers being movable between an open position and a closed position, wherein in said closed position said gripping member is detachably connected at the other of said end portions of said two control levers to the other of said control levers, said one gripping member, said one control lever and said other control lever forming a gripping cavity for holding an object, and in said open position said at least one gripping member being spaced from said other of said end portions control lever,
   said spring member being movable between an unbiased spring position and a biased spring position, wherein when said one gripping member with two control levers are in either said open or closed positions, said spring member is in said unbiased spring position wherein said end portions are spaced apart at a first distance; and wherein when said said one gripping member and said two control levers are being moved between said open and closed positions, said spring member is in said biased spring position wherein said end portions are spaced apart at a second distance greater than said first distance,
   two resilient mounting members having opposed connecting ends and base ends, said connecting ends being secured to said end portions of said spring member, said two mounting members being movable between unbiased and biased mounting positions, wherein when said one gripping member and said two control levers are in either said open or closed positions and said spring member is in said unbiased mode, said two mounting members are in said unbiased mounting position wherein said connecting ends are spaced apart at a first length; and wherein when said one gripping member and said two control levers are being moved between said open and closed positions and said spring member is in said biased mode, said two mounting members are in said biased mounting position wherein said connecting ends are spaced apart at a second length greater than said first length, and
   a substantially flat base connected to said base ends of said mounting members, said base being disposed on said closed side of said spring member, wherein the sum of the distances between said middle film-hinge and said two film-hinges is greater than the distance between said two film-hinges, and wherein in said closed position said two control levers fit into said open side of said spring member so that the sum of the distance between said middle film-hinge and said two film-hinges is only a little less than the uncoiled length of said resilient spring member.

2. A holding system according to claim 1, wherein said mounting members include opposing substantially flat sides and extend from said base ends forming opposed substantially equal acute angles with said base.

3. A holding system according to claim 2, wherein said resilient spring member is spaced from said base.

4. A holding system according to claim 3, wherein said acute angles are approximately 79 degrees.

5. A holding system according to claim 4, wherein said resilient bending member has a width, said mounting members having an equal width at said connecting ends and having a greater width at said base ends.

6. A holding system according to claim 5, wherein said mounting members include substantially flat counter surfaces opposed to said flat sides, said flat outer surface forming opposed outer acute angles with said base, said outer obtuse angles being approximately 105 degrees.

7. A holding system according to claim 6, further including a second gripping member connected to said other of said end portions and means for detachably connecting said at least one gripping member with said second gripping member in said closed position.

8. A holding system according to claim 7, wherein said at least one gripping member and said second gripping member have free end portions, said free end portion of said at least one gripping member forming a recess facing said gripping cavity and said free end portion of said second gripping member including a projection adapted to fit into said recess in said closed position.

9. A molding system according to claim 8 wherein said spring member, said control levers, said gripping members, and said mounting members have generally equal widths, said widths being approximately at least 12 millimeters.

10. A holding system according to claim 8, wherein said gripping cavity is approximately at least 25 millimeters in diameter.

* * * * *